3,850,845
METAL OXIDE PASTE DISPERSIONS AND USE AS CURING AGENTS

Glenn C. Vickery, Barberton, Ohio, assignor to Basic Incorporated, Cleveland, Ohio
No Drawing. Filed Apr. 25, 1973, Ser. No. 354,339
Int. Cl. B01j *11/52*
U.S. Cl. 252—430         9 Claims

ABSTRACT OF THE DISCLOSURE

Metal oxide paste co-dispersions comprising a mixture of magnesium oxide and zinc oxide, a nonaqueous liquid vehicle and a surface active agent are described. The pastes are useful as curing or vulcanizing agents for halogen-containing polymers such as neoprene. A method is described for obtaining storage stable neoprene.

BACKGROUND OF THE INVENTION

The present invention relates to novel paste co-dispersions of mixtures of metal oxides, and more particularly, to such co-dispersions in nonaqueous liquids which are water-resistant.

This invention also relates to unique improvements heretofore unobtainable in polymer processing brought about by the use of such novel paste co-dispersion, and more particularly, the improvement in hot humid storage stability of halogen-containing polymers and silica containing mixed polymer compounds.

This invention also relates to a new and improved process for curing halogen-containing polymers through the use of the above paste co-dispersion.

The invention of this application particularly is concerned with halogen-containing polymers such as the haloprenes having general formula

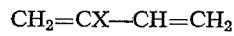

$$CH_2=CX-CH=CH_2$$

in which X represents halogen. The most widely known and used haloprene is chloroprene wherein X in the above formula is chlorine. Neoprene is the generic name which is applied to polymers of 2-chloro-1, 3-butadiene (Chloroprene), and copolymers of chloroprene with dienes of vinyl compounds (such as acrylonitrile, butadiene, isoprene, dichlorobutadiene and styrene) in which the chloroprene comprises the predominant monomer.

Polychloroprenes differ greatly from other synthetic rubbers and from natural rubber in the manner in which they can be vulcanized. With most types of chloroprenes, good vulcanizates can be obtained by incorporating certain metal oxides in the plastic polymer and heating to effect vulcanization. Magnesium oxide, zinc oxide, and in certain applications litharge are recommended. Certain organic accelerators often are utilized in conjunction with the metal oxides which increase the rate of cure and improve the cured properties. With some types of polychloroprene, such as the Neoprene W types, metal oxides act slowly and do not produce a high state of cure even after long periods of heating. With polychloroprenes of this type, accelerators are necessary for a good cure. Among the accelerators which have been utilized are catechol, "Permalux" (the di-orthotolyl guanidine salt of di-catechol borate), hexamethylene tetramine, and alkyl substituted thioureas such as ethylene thiourea (known as "NA–22"). These accelerators, which are in general use today, produce a higher state of cure as evidenced by higher modulus, etc.

These accelerators suffer, however, from many disadvantages which greatly limit their use. Thus, some are "scorchy," that is, they are so active at relatively low temperatures that the polychloroprene is liable to become unmanageable due to premature curing during processing.

The presence of scorch is most noticeable in the case of polychloroprenes which are made in the presence of aliphatic mercaptans.

The most popular and most widely used curing agent for neoprene is the combination of magnesium oxide and zinc oxide. The reason for the superior performance of magensium oxide and zinc oxide in combination is not fully understood. Zinc oxide is desirable as the sole curing agent to accelerate the curing rate producing what is referred to as "flat curing." However, the product obtained in this manner is described as "scorchy."

On the other hand, magnesium oxide is desirable as the sole curing agent to produce neoprene stocks with high modulus and to retard the accelerated cure rate effects of zinc oxide. However, magnesium oxide alone produces a slow cure and does not produce "flat curing." The combination of the two metallic oxides overcomes the deficiencies of either one used alone. It has been suggested that the magnesium oxide acts as a scavenger for any acidic chlorine such as HCl liberated by the compounded neoprene during processing, storage and cure, and in this manner the magnesium oxide controls the reaction.

One of the serious disadvantages which has been associated with the conventional use of the powdered magnesium oxide and zinc oxide concerns the order of addition. The two oxides usually are added to uncured neoprene after the neoprene has massed or banded, but not before. In no case can zinc oxide be added first to a neoprene batch mixed in a banbury internal mixer or two roll mill, followed by carbon black or silica pigment mixing and then magnesia last. Further, in no case can high concentrations of zinc oxide be well mixed into neoprene before magnesium oxide is added. Otherwise, serious scorch difficulties will result. If a cure is attempted, especially in pigmented banbury mixing, by adding a premixture of zinc oxide and magnesium oxide in powder form or by adding the magnesium oxide and zinc oxide separately at the same time, the zinc oxide action usually predomniates and produces scorch tendencies in the compounded polymer product, sometimes with a cure rate so fast that the compound will set up, cure, or scorch in the mixer.

Magnesium oxide and zinc oxide customarily have been added to the start of neoprene rubber mixing cycles as dry powders. Such dry powder mixing processing requires equipment, labor, and time for masticating, banding and mixing, with serious tendencies toward sticking and caking to mill rolls and banbury rotors. This procedure is substantially the same whether one ingredient or several are incorporated into the mixture at the same time, especially where the two metal oxides are added after massing or banding but before pigment addition. Accordingly, the necessity of admixing magnesium oxide thoroughly with the neoprene and thereafter, in a separate mixing operation, admixing zinc oxide therewith appreciably increases the cost of the compounding process. The cost of such compounding is further increased because the mixing of the magnesium oxide with the neoprene raises the temperature of the mixture, especially when pigment such as carbon black is present, and the mixture must be cooled prior to the addition of the zinc oxide if scorchiness is to be minimized. Further, in pigmented banbury mixing where magnesium and zinc oxides are added together at the start of the mix, serious scorch tendencies often result because fine particle size, 180 m.$^2$/g.) magnesium oxide mixes so much slower than the relatively coarser (1–10 m.$^2$/g.) zinc oxide.

The use of powdered magnesium oxide requires special handling and storage facilities because of the sometimes severe hydration tendencies of magnesia. Unless magnesium oxide is protected from the ravages of moisture and carbon dioxide attack, a serious and sometimes disastrous drop in scorch protection of neoprene will result. This is especially true of magnesium oxide and zinc oxide mixtures, because if the magnesium oxide in the mixture hydrates, then effectively only zinc oxide would be added, causing truly disastrous scorch, particularly where the mixture is added at the start of the mix instead of the end. Also, the use of powdered magnesium oxide and zinc oxide presents dusting problems which are a serious health and safety hazard. Attempts to overcome the dusting problems by adding the oxides as a dispersion or suspension in oil have not been too successful because it requires fairly large amounts of oil and the oil does not blend well with neoprene. The tendency of the oxide to settle in the oil creates additional handling problems. It also is accepted generally that predispersed forms of magnesium oxide cause an undesired drop in modulus of cured neoprene articles.

Both zinc oxide and magnesium oxide powderes present serious mixing problems often resulting in white specks of undispersed metal oxide particles in the end cured neoprene article.

It is well known that stray traces of zinc oxide powder left in the mixer from a preceding batch often scorches subsequent batches. Improperly mixed zinc oxide also can cause electrical failure of cured wire and cable compounds, and can cause tensile failure of cured fine cut thread compounds.

The degree of completeness of the zinc oxide dispersion also is critical to obtain good (low) compression set and good heat aging of the end cured vulcanizate. Heat aging quality is best determined by retention of elongation after heat aging. It is usually is necessary to add the zinc oxide in a second banbury mixing step in order to achieve good dispersions. Zinc oxide is difficult to disperse thoroughly when added at the end of a one-pass banbury mix.

Heretofore, with conventional metal oxide curing agents, it has been generally accepted that the storage stability of conventional neoprenes, both raw polymer stock and compounded mixed stock, is poor especially when stored under hot humid conditions often causing complete loss of stock due to scorch. Hot humid storage stability is generally considered the most serious neoprene processing difficulty, with dry heat storage stability another serious processing difficulty.

Normally, 4 phr. of magnesia and 5 phr. zinc oxide are utilized in neoprene compounding for best balance of process safety and vulcanizate quality, especially heat resistance and compression set. If zinc oxide levels are reduced, or magnesia levels are increased, the heat aging and compression set vulcanizate qualities usually suffer. Accordingly, the ratio of 4 phr. magnesia and 5 phr. zinc oxide has been used quite consistently since it was first adopted in the early 1930's.

Compounded neoprene stocks containing mangesia and zinc oxide historically have increased in Mooney viscosity during storage prior to curing. This is undesirable because stocks that have increased in viscosity tend to scorch easily when extruded or calendered.

SUMMARY OF THE INVENTION

These and other problems have been overcome by providing a novel, water-resistant paste co-dispersion comprising a mixture of fine particle-size magnesium oxide and zinc oxide, a liquid vehicle, and a surface active agent. These paste co-dispersions may be utilized in the processes for curing halogen-containing polymers and provide an order of process safety and hot humid storage stability which has not heretofore been attainable. The cured polychloroprenes obtained with the use of the co-dispersions of this invention exhibit scorch times which are higher than normally obtained and even higher than when the halogenated polymer contains magnesium oxide and no zinc oxide at all. The paste co-dispersions provide this processing, handling and storage safety with practical cure times.

Thus, an uncured halogenated polymer containing the paste co-dispersions of this invention is cured easily at elevated temperatures when desired even after protracted bin storage. It is now possible to process neoprene like simple SBR polymer.

DESCRIPTION OF THE PREFERRED EMBODIMENTS

The paste co-dispersions of this invention comprise a mixture of fine particle-size magnesium oxide and zinc oxide, a liquid vehicle and a surface active agent. Generally, the co-dispersion will contain a high concentration of the oxides, namely, of from about 50 to about 80% by weight. The amount of magnesium oxide within the paste co-dispersion may vary from about 30 to 80 parts while the amount of zinc oxide may vary from about 10 to 60 parts. It has been found that any magnesium oxide and zinc oxide can be utilized in the preparation of the paste co-dispersions of this invention, although it may be necessary in some instances to reduce the particle size of the oxide material prior to formation of the paste.

The paste co-dispersions of the invention are prepared by introducing the magnesium oxide and zinc oxide into a mixer along with the liquid vehicle and the surface active agent. The oxide, as mentioned above, may be in a sufficiently finely divided state as the result of normal processing of the material, or first may be comminuted in a mill to a fine state. For example, magnesium from sea water is in a finely divided form normally, having an average particle size in the range of from about 0.02 to about 1 micron. Zinc oxide, on the other hand, should be reduced to a fine particle size by comminution, for instance, in a ball mill, to an average particle size of about 1 micron. Generally speaking, it is desirable to have as fine a particle size as possible for the solid material although satisfactory results are obtained with an average particle size ranging up to about 10 microns. A preferred sizing range is between 0.02 to about 2 microns.

Following the mixing, the discrete powder material with vehicle and surface active agent added thereto is passed through a colloid mill. In the colloid mill, the flowable granular mixture is converted to a paste. This is accomplished substantially instantaneously with a holding time of less than a few seconds.

Conventional gap settings and speeds for the colloid mill can be employed. Use of a gap setting in the range of 0.02 to about 0.080 inches is acceptable, with a gap setting in the range of 0.010 to 0.025 inches being preferred. Conventional speeds for the colloid mill are utilized, and these are in the range of 1000 to 20,000 r.p.m.

In the present invention, the concentration of solid particles in the mixture placed in the mixer is purposely high so that following mixing, the mix remains a flowable granular product. The surprising aspect is that this granular mixture can then be converted to a cohesive soft paste, substantially instantaneously, by passage through the colloid mill.

The actual proportions of solid material, vehicle and surface active agent must be predetermined for each dispersion. The proportions will vary depending upon the type of vehicle, the type of surface active agent, and on the particle size of the materials. Particularly, the amount of vehicle and surface active agent should be insufficient to form a continuous liquid phase in the premix, but should be sufficient that during passage through the colloid mill conversion to paste occurs.

The initial mixing of the powdered material, surface active agent and liquid vehicle can be carried out in various types of mixers, such as turbine-type mixers, twin-rotor mixers, twin-shell blenders, ribbon blenders, muller-mixers, high speed, single and multiple rotor mixers, and kneader-mixers. Particularly effective results are obtained in a single-rotor mixer such as the Lodige mixer, made by Littleford Brothers, Cincinnati, Ohio, in which the primary mixing is done by multiple plow blades on a horizontal shaft operating at a speed of about 155 r.p.m. Secondary mixing can be accomplished by small "chopper" blades in the mixer. The advantage of this mixer is the speed with which mixing is accomplished reducing the likelihood of hydration of the water sensitive magnesium oxide.

The liquid vehicle employed can be any conventional non-aqueous liquid used in polymer compounding. The vehicle may be oils, organic alcohols and acids and their esters, or resins and polymers. Examples of useful oils include mineral oils, vegetable oils, animal oils, synthetic oils and petroleum oils such as the paraffinic, naphthenic and aromatic oils. Examples of the vegetable oils which may be utilized include castor oil, linseed oil, soybean oil, rapeseed oil, etc. The alcohols, acids and esters thereof are illustrated by propylene glycol, polyethylene glycol, butyl oleate, dibutylphthalate, dicotylphthalate, tricresyl phosphate, dioctyl sebacate.

Although the vehicle may have a relatively high viscosity and boiling point to minimize volatility since heat is generated in the colloid mill, the use of low viscosity vehicles is within the scope of this invention. A vehicle having a relatively high viscosity, for instance in the range of 1000–6000 SUS at 100° F., preferably about 2000 SUS, also has the advantage of providing a dispersion having optimum paste consistency and minimum volatility during subsequent polymer compounding and curing steps. In the case of the polymer compounding, this prevents undue porosity of the polymer product. A high viscosity vehicle is also likely to exhibit more compatibility with the polymer. A very suitable naphthenic mineral oil vehicle is Sunoco's Sunthene No. 4240 (trademark) having a viscosity of about 2206 SUS at 100° F. Sunoco Sunthene 5600 (SUS–5000) and Sundex 790 are other examples of useful mineral oils. Other useful high molecular weight liquid vehicles include propylene glycol and polyethylene glycol (molecular weight above 1500 preferred). Suitable low viscosity oils which can be employed are Sunthene 415 (a light naphthenic oil, trademark Sunoco) having a viscosity at 100° F. of about 155 SUS, and Sunpar No. 107 (a light paraffinic oil, trademark Sunoco) having a viscosity at 100° F. of about 72.5 SUS. With such relatively light oils, a correspondingly smaller gap setting in the colloid mill may be desirable. Other low viscosity vehicles which can be employed are kerosene, the chlorinated hydrocarbons such as 1,1,1-trichloroethylene, and other halogenated hydrocarbons.

Desirable properties for the vehicle are resistance to physical and chemical changes with heat, and compatibility with the particulate solids and proposed utility, i.e., compounding with a polymer compound. Good lubricity may also be desirable for subsequent compounding and processing steps. Naphthenic, promatic or paraffinc mineral oils are preferred over vegetable oils since the latter generally are not considered heat stable, or stable on storage. Non-hygroscopic vehicles are preferred in neoprene compounding to reduce the possibility of ionization of any hydrogen chlorides present.

The amount of vehicle utilized in the paste co-dispersion of this invention may vary depending on the physical characteristics of the solid ingredients. Generally up to about 15 or 60 parts of liquid vehicle is included and preferably between 20 and 35 parts of the vehicle are utilized.

The paste co-dispersions of this invention contain, in addition to the metal oxides and liquid vehicle, a small amount of a surface active agent, although this may vary depending upon the oxide content and the vehicle used in the preparation of the co-dispersion. For a fine particle size material, a preferred amount is about 2 to 5%, whereas for coarser or denser materials, about 1 to 2% of the surface active agent may be useful, although for most purposes, 5% should suffice. It may be possible in some instances to obtain paste dispersions with certain vehicles without the surface active agent when the concentration of oxides is low, i.e., below about 65%.

Suitable surface active agents which may be employed in the co-dispersions of this invention are surfactants which are well known in the art. Generally, such agents should be oil soluble or dispersible having a hydrocarbon chain containing from about 2 to about 75 carbon atoms. The longer hydrocarbon chains such as those having at least nine carbon atoms are more generally oil soluble. The surfactants also should contain strong polar groups such as hydroxyl or carboxyl groups to impart surface active properties. For subsequent polymer compounding, the monoglyceride materials having hydroxyl groups thereon are useful (since these hydroxyl groups do not adversely affect the polymer product.

The surface active agents which are contemplated as being useful in the pastes of the invention may be either ionic or non-ionic agents. Examples of the types of agents which are useful include fatty acids, sorbitan fatty acid esters, fatty alcohols, mono and diglycerides, polyoxyethylene acids, glycols and esters, alkyl aryl sulfonates, metal salts of petroleum sulfonates, organic amines and amides, etc.

More specific examples of surface active agents which may be utilized include acetic acid, propionic acid, stearic acid, iso-stearic acid, oleic acid, naphthenic acid, salicylic acid, sebacic acid, lauryl amine stearate, sorbitan monooleate, sorbitan trioleate, pentaerythritol tetrastearate, di-octyl-phthalate, sodium petroleum sulfonate, oleyl amine, diamyl amine, glyceryl mono-ricinoleate, polyethylene glycol mono-ricinoleate, nonyl alcohol, tetradecane amide, decylnaphthalene sulfonic acid, tri-decylbenzene sulfonic acid, sodium di-dodecylbenzene sulfonate and ammonium heptylbenzene sulfonate.

Also useful as surface active agents are the phosphatides, especially those having the following formula:

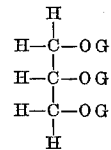

wherein G is selected from the class consisting of fatty acyl radicals, phosphorous-containing radicals having the structural grouping

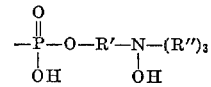

and phosphorous-containing radicals having the structural grouping

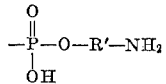

wherein R' is a lower alkylene radical having from 1 to about 10 carbon atoms and R" is a lower alkyl radical having from 1 to 4 carbon atoms, and at least one, but no more than two of the G radicals being said phosphorous-containing radical. The fatty acyl radicals are for the most part those derived from fatty acids having from 8 to 30 carbon atoms in the fatty radicals, e.g., octanoic acid, stearic acid, oleic acid, palmitic acid, myristic acid, and oleostearic acid. Especially desirable radicals are those derived from commercial fatty compounds such as soya bean oil, cottonseed oil, and castor seed oil.

Soya bean lecithin is the most desirable phosphatide, both from a commercial and economic standpoint. Soya bean lecithin is described in detail in *Encyclopedia of Chemical Technology*, Kirk and Othmer, Vol. 8, pages 309–326 (1952).

Although the co-dispersions described above are, in themselves useful, they nevertheless are susceptible to improvement by the incorporation of modifying agents which impart properties desired for various specific applications. For example, stabilizers which function to improve the stability of the co-dispersion against deterioration due to temperature, pressure, oxidation of the mineral oil, and other harmful environments are desirable. Among such materials are included waxes, metallic soaps, and clay. The amount of such modifying agent included in the co-dispersion can vary depending upon a particular agent and desired properties. Generally, up to about 25% of the modifying agent is utilized in the co-dispersions.

Waxes also may be utilized as modifying agents in the co-dispersions of this invention and these may be either mineral waxes, vegetable waxes, animal waxes or synthetic waxes. Examples of mineral waxes include paraffin, microcrystalline, oxidized micro-crystalline, and montan waxes. Examples of vegetable waxes include castor, carnauba, esparto, flax, sugarcane, and candelilla. Beeswax is an example of an animal wax.

Metallic soaps are also useful as modifying agents in the co-dispersions of this invention. These agents are the salts of heavy metals such as zinc, lead, aluminum and magnesium, with higher fatty acids such as oleic, stearic, palmitic, erucic and lauric acids. The metallic soaps and the waxes can be incorporated into the co-dispersion in amounts up to about 25% and function as thickening agents.

The clay ingredient of the co-dispersion may be any one of several clays such as, for example, kaolinite, anauxite, attapulgite, nakrite, china-clay, or bentonite. By reason of its commercial availability, low cost, and ease of emulsification, bentonite is usually preferred. Powdered and granular forms of the clay have been employed in the invention. These clays are utilized in the co-dispersion as thickening agents and may actually function as part of the dispersing medium.

As mentioned above, it is possible to incorporate other agents into the paste co-dispersions as may be desired depending upon the particular end use of the paste. For example, where the paste co-dispersions are to be incorporated into vulcanizable or curable polymers for the purpose of effecting a cure by the metal oxide, and a more rapid rate of cure is desired than is afforded by the metal oxides alone, the normally used organic accelerators may be incorporated in the pastes. Such organic accelerators are well known in the art and include, for example, catechol, hexamethylenetetramine, and cyclic thioureas, such as described in U.S. Pat. 2,544,746. An example of an often used commercially available cyclic thiourea is ethylene thiourea available under the trade designation NA–22 from E. I. du Pont de Nemours & Company.

Like many of the accelerators which are utilized commercially, NA–22 is a fine powder, and when attempts are made to incorporate this powder into the polymer stock there is considerable dusting which presents a serious health problem and safety hazard. Also, losses from the fly escape during processing adds to the cost. Therefore, this invention contemplates incorporating accelerators such as NA–22 into the co-dispersions of the invention prior to blending with the polymer stock. This is accomplished by adding the accelerator to the powder mixture in the initial mixing apparatus. Various amounts of accelerator can be included depending upon the end use of the paste, and if difficulties arise as a result of the increased solids content of the paste mixture, the amounts of magnesium oxide or zinc oxide in the paste can be reduced accordingly.

A preferred colloid mill which can be employed is the paste-type Premier colloid mill, although for purposes of the present application, the term "colloid mill" includes any high-speed disk or cone mill such as that of Morehouse, or disk attrition mill, such as that made by Bauer or Sprout-Waldron, or the Burstone Mill. Preferably the mill is equipped with a hard abrasive millstone surface, or an artificial abrasive surface such as silicon carbide or aluminum oxide, to provide intensive grinding action in operation. As mentioned previously, the mill preferably has a gap opening of between about 0.001 to about 0.025 inches. The larger gap increases throughput of the colloid mill, but conversion may be erratic at too large a gap. Small gaps cause stone breakage. An optimum gap depends upon the materials employed, but 0.020 inches appears to provide 100% conversion with near maximum throughput. With the use of a very light vehicle, such as Sunthene No. 415, or Sunpar No. 107 and a very fine particle size, a gap setting as small as 0.0003 inches may be employed.

The following examples illustrate the processes of the invention, the products obtained thereby, and the improvement over the prior art. Unless otherwise indicated, all parts and percentages are by weight. The iodine adsorption numbers reported below are defined as the milliequivalents of iodine adsorbed by 100 grams of magnesium oxide. The iodine number is measured in accordance with the procedure described by W. H. Deis et al. in "Magnesium Oxides in Elastomers," *Rubber World*, September 1964, p. 64.

PREPARATION OF PASTE CO-DISPERSIONS

Example 1

A mixture is prepared using the following formulation:

|  | Parts by Weight |
|---|---|
| Magnesium oxide powder (98% Pure, Iodine Adsorption No. of about 135) | 40 |
| Zinc oxide (Powder having a surface area of about 4 m.$^2$/g. available from New Jersey Zinc Company under the designation XX4) | 35 |
| Sorbitan mono-oleate | 1 |
| Micro-crystalline wax (Softening point 82–88° C.) | 3 |
| Mineral oil (Sunthene 4240 from Sunoco having a Saybolt Universal viscosity of about 2206 seconds at 100° F.) | 21 |

The above mixture, which is a dry powder after mixing in a pony mixer, is fed into a Premier colloid mill having a gap setting of 0.003". A cohesive fluid paste is produced in the mill at an exit temperature of about 150° C. This warm paste, when cool, is firm but not tacky. It is extruded, cut into suitable lengths and packaged.

This paste exhibits excellent lubricity and particle mobility. The paste dispersion also is very storage stable and resists the effects of changes in temperature, humidity and time.

Examples 2–7

These examples illustrate the preparation of paste dispersions of the invention containing varying amounts of magnesia and zinc oxide. The procedure utilized for the preparation of the pastes is the same as that described in Example 1. The formulation utilized in the preparation of the pastes of these examples are as follows:

|  | Parts by weight | | | | | |
|---|---|---|---|---|---|---|
| Example No. | 2 | 3 | 4 | 5 | 6 | 7 |
| Magnesium oxide of example 1 | 45 | 47 | 50 | 52 | 55 | 60 |
| Zinc oxide powder of example 1 | 24.9 | 22.9 | 19.9 | 17.9 | 14.9 | 9.9 |
| Protox 169 (a surface treated zinc oxide powder available from the New Jersey Zinc Co. and having a particle surface area of about 10 m.$^2$/g.) | 0.1 | 0.1 | 0.1 | 0.1 | 0.1 | 0.1 |
| Sorbitan trioleate | 1 | 1 | 1 | 1 | 1 | 1 |
| Micro-crystalline wax (82–88° C. softening point) | 4 | 4 | 4 | 4 | 4 | 4 |
| Mineral oil of example 1 | 25 | 25 | 25 | 25 | 25 | 25 |

Example 8

A mixture is prepared using the following formulation:

| | Percent by Weight |
|---|---|
| Magnesium oxide (98% Pure, Iodine Adsorption No. of about 135) | 40 |
| Zinc oxide (Powder having surface area of about 4 m.$^2$/g. available from New Jersey Zinc Company under the designation XX4) | 35 |
| Stearic acid | 1 |
| Micro-crystalline wax (Softening point 82–88° C.) | 4 |
| Mineral oil (Sunthene 4240 from Sunoco having a Saybolt Universal viscosity of about 2206 seconds at 100° F.) | 20 |

A paste dispersion is obtained by treating the above powdery mixture in accordance with the procedure described in Example 1.

Example 9

A paste co-dispersion is prepared from the following formulation in accordance with the procedure of Example 1.

| | Percent by Weight |
|---|---|
| Magnesium oxide powder (98% Pure, Iodine No. of about 100) | 50 |
| Zinc Oxide Powder of Example 1 | 19.9 |
| Protox 169 | 0.1 |
| Sorbitan trioleate | 1.0 |
| Castor Wax | 4.0 |
| Mineral oil of Example 1 | 25 |

Example 10

A paste co-dispersion containing an organic accelerator is prepared from the following formulation in accordance with the procedure described in Exanple 1:

| | Percent by weight |
|---|---|
| Magnesium oxide of Example 1 | 47 |
| Zinc oxide powder of Example 1 | 20 |
| NA–22 | 3 |
| Sorbitan trioleate | 1.0 |
| Castor wax | 4.0 |
| Mineral oil of Example 1 | 25 |

The advantages of the paste co-dispersions of the invention are many. An important advantage or improvement is the reduction, if not elimination, of hot humid storage difficulties of compounded neoprene stocks, especially those containing silica pigments. The water immersion resistant paste co-dispersions of the invention eliminate the magnesium oxide hydration difficulties.

The paste co-dispersions of this invention greatly minimize or eliminate althogether: zinc oxide powder mixing difficulties and the resulting electrical failure in wire and cable products which often results from poor mixing; tensile failure of cut thread products; scorch from stray traces of powdered or poorly dispersed zinc oxide; and unsightly white specks of poorly dispersed zinc oxide in end cured neoprene articles.

Obtaining a high metal oxide loading in a paste dispersion, as compared to conventional dispersions, means there is less dilution of the product into which the dispersion is compounded. In addition, the dispersions have a higher degree of activity, probably due to an increase in the available surface area of the solid brought about by deagglomeration and some comminuting of solid particles, and also due to a thinner film of vehicle covering each particle. In this respect, it has been found that a magnesium oxide, zinc oxide mixture dispersed according to the teachings of this application, has a much higher activity in a polymer than the same oxide mixture milled directly into the polymer. An inexpensive lower Iodine Adsorption Number magnesium oxide can provide in rubber a scorch resisting activity equivalent to that obtained from an expensive much higher Iodine Number dry powder. Certain additional economies result from the higher loading, for instance, lower freight rates per pound of active material. Also, since the conversion of treated powder to paste is accomplished in essentially one step, avoiding pump recycle and multiple steps, a reduced cost of processing is effected. A rapid cycle time results in less energy cost for mixing and transport. It also results in less hydration of moisture sensitive solid materials and breakdown of heat sensitive vehicles. It also has been observed that the use of the paste allows for faster and more uniform mixing of the oxides into polymers, for example, than can be attained by adding the oxides to the polymer as powders. Other advantages of utilizing the paste form rather than the powdered form of the oxides were discussed previously.

One of the particularly useful applications of the paste co-dispersions of the present invention is in the curing or vulcanization of halogen-containing polymers. The use of the paste allows safe one-pass mixing of the two essential oxides, namely, magnesium oxide and zinc oxide, into the polymer.

The halogen-containing polymers which can be treated with the co-dispersions of this invention include the haloprenes having the following structure:

$$CH_2=CX-CH=CH_2$$

wherein X is a halogen. The most popular and widely used haloprene is chloroprene (2-chloro-1, 3-butadiene) which has been given the generic name "neoprene." Neoprene is a particularly versatile elastomer because it is suitable for many and varied applications. Cured neoprenes have high tensile strength, resilience, and abrasion resistance. Cured neoprene stands out particularly for its ability to resist deterioration by oils, solvents, weather, oxygen, ozone, and heat.

Neoprene also is a generic name for copolymers of chloroprene with dienes or vinyl compounds such as acrylonitrile, butadiene, isoprene, dichlorobutadiene, and styrene, in which copolymers the chloroprene is the predominant monomer. In this application the term "polymer" will include such copolymers. These polymers usually are prepared in aqueous emulsions and are available on the market in dry form under names such as Neoprene Type GN, Neoprene Type W, Neoprene Type FR, Neoprene Type T, etc. General discussions on neoprene preparation compounding and curing is found in textbooks on rubber-like polymers, such as *The Neoprenes*, Murray & Thompson (1963), published by E. I. du Pont de Nemours.

Metallic oxides are required to regulate the scorch and cure rate of neoprene compounds. In addition, they have been found to be essential for producing cured neoprenes of good quality. Magnesium oxide and zinc oxide produce the best balance of processibility, cure rate, and product quality. It has now been found that the paste co-dispersions of this invention can be used effectively to regulate the scorch and cure rate of neoprene compounds, and that the use of such paste provides a measure of safety from scorching especially in hot humid storage of mixed compound and more particularly, hot humid storage difficulties of silica containing compounds which has heretofore been unavailable.

The amount of paste-dispersion incorporated into the halogen-containing polymers will vary depending upon the desired cure rate, the concentration of metal oxides in the dispersion, the relative amounts of magnesium oxide and zinc oxide in the dispersion, and the presence of other agents such as accelerating agents in the dispersion. Generally, from about 0.2 to about 12 parts by weight of the co-dispersion is utilized based upon 100 parts by weight of the polymer. A preferred range of the amount of co-dispersion is from about 3 or 4 parts to 8 parts by weight to about 100 parts of polymer. A particular advantage of the paste co-dispersions of this invention is that the paste can be safely mixed with the polymer stock at any time during the compounding cycle. It is especially noteworthy that the paste can be added at the very beginning of the compounding cycle, that is, before or during the massing or banding of the polymer stock. It is possible to smear or band the paste co-dispersion of this invention to a two-roll mill and then add the polymer quite easily.

It has been mentioned several times previously, one of the unique advantages of the paste co-dispersions of this invention is the order of process safety imparted to the halogenated polymers containing said paste especially of mixed compound stored under hot humid conditions. Historically, the sensitivity of neoprene-type polymers, especially when stored in hot humid conditions, to the addition of reinforcing agents and fillers such as carbon black and mineral fillers has been much greater than many other rubbers. Accordingly, the application of neoprene for end uses requiring any addition of such agents and fillers has been somewhat limited. However, in view of the improved and increased safety factors built into neoprene by the paste co-dispersions of this invention, it is possible to incorporate such agents and fillers into the neoprene co-dispersion mix without negatively affecting the properties of the neoprene. For example, it is possible to incorporate anti-oxidants and anti-ozonates which have heretofore been difficult to incorporate into neoprene because many of the antioxidants and antiozonates resulted in a very scorchy neoprene.

The incorporation of carbon black for its desirable properties into neoprene also has presented problems because the temperature of the polymer mix increases during the addition of the carbon black resulting in a premature curing. It has been found that when the neoprene polymers contain the co-dispersions of this invention, carbon blacks can be incorporated into the neoprene-paste mixture without a scorch problem. In the same manner, non-black fillers such as clays, whitings, and silicas, such as calcium silicate and precipitated silicon dioxide can be incorporated into the treated neoprenes without creating a scorch problem even when stored under hot humid conditions.

COMPOUNDING OF PASTE DISPERSIONS IN POLYMERS

The paste dispersions of the invention can be incorporated into polymers by any known technique, such as milling. One of the advantages of introducing the zinc oxide into the polymer stock through the use of the paste dispersions of the present invention is that the paste may be added to halogen-containing polymer stock such as polychloroprene at any temperature without imparing the quality of the polymer. Indeed, early incorporation of the co-dispersion in a neoprene compound allows subsequent incorporation of other heretofore difficult to mix fillers without the need for protracted mixing time and associated and undesirable heat build-up in stock. Thus, it is unnecessary to carefully monitor the temperature of the polychloroprene as the paste is introduced and one-pass mixing is realized. The following examples illustrate the preparation of the uncured and cured polymers of the invention.

Examples A-G

Polychloroprene samples are compounded according to the following formulas:

| Example | Parts by weight | | | | | | |
|---|---|---|---|---|---|---|---|
| | A | B | C | D | E | F | G |
| Neoprene GNA-140P (From E. I. du Pont Co.) | 100 | 100 | 100 | 100 | 100 | 100 | 100 |
| Stearic acid | 0.5 | 0.5 | 0.5 | 0.5 | 0.5 | 0.5 | 0.5 |
| Paste of example— | | | | | | | |
| 1 | 6.0 | | | | | | |
| 2 | | 6.0 | | | | | |
| 3 | | | 6.0 | | | | |
| 4 | | | | 6.0 | | | |
| 5 | | | | | 6.0 | | |
| 6 | | | | | | 6.0 | |
| 7 | | | | | | | 6.0 |

The above examples of the invention are carried out by placing the neoprene on a two-roll mill and banding it to the slow roll in about one minute. The stearic acid is then mixed with the neoprene on the mill for about one-half minute. The oxide paste dispersions of the invention as prepared in Examples 1–7 are added to the neoprene stock and normally are completely incorporated in only 20 seconds. The mixing is exceedingly fast due to the thixotropic nature of the paste. After a total of two minutes from the time the neoprene is first put on the mill, the material is cut and mixed on the rolls for an additional two minutes. The compounding is completed in a total time of four minutes from the time the neoprene is first placed on the mill.

The curing characteristics of the compositions of the above examples are determined in an oscillating disk rheometer (ODR) in accordance with ASTM D2705. Mooney Scorch is determined according to ASTM D1646. In the ODR test, a 1° arc is utilized and the temperature is 153° C. The results of this testing are summarized below:

| Product of example | ODR cure trace | | | | | | |
|---|---|---|---|---|---|---|---|
| | A | B | C | D | E | F | G |
| Test results: | | | | | | | |
| Minimum torque (ML) | 2.0 | 2.0 | 1.5 | 1.8 | 1.8 | 2.0 | 3.0 |
| Scorch time ($T_s2$) | 8.8 | 9.0 | 10.2 | 9.6 | 9.4 | 9.6 | 9.0 |
| Optimum cure time ($T_c$ 90) | 13.7 | 15.7 | 18.2 | 17.2 | 17.4 | 18.0 | 22.8 |
| Optimum cure torque ($M_c$ 90) | 20 | 21.5 | 21 | 21.5 | 21.5 | 22.5 | 19 |
| Maximum torque ($M_H$) | 22 | 24 | 23.5 | 24 | 24 | 25 | 26 |

The scorch characteristics of the compositions of Examples A–G are determined on a Mooney Viscometer. The following values represent the number of minutes required for a 5 point rise above the minimum value at a temperature of 121° C.

MOONEY SCORCH

Product of Example:                           $T_5$ at 121° C.
A _____ 64.0
B _____ 65.0
C _____ 68.5
D _____ 68.0
E _____ 62.5
F _____ 67.0
G _____ 63.5

The above scorch test results indicate the improved properties of the polymer compositions since the longer the scorch time, the less scorchy the stock. In comparison, a stock comprising 100 parts of GNA, 0.5 parts of stearic acid and 5 parts of zinc oxide has a scorch time ($T_5$ @ 121° C.) of five minutes. A similar stock with 4 parts of magnesium oxide in lieu of the zinc oxide has a scorch time ($T_5$ at 121° C.) of 60 minutes. In a similar stock containing 4 parts of magnesium oxide and 5 parts of zinc oxide added in the given order in powder form, a scorch time ($T_5$ at 121° C.) of 40 minutes results.

Examples H–M

These examples demonstrate the effectiveness and advantages of the use of the paste dispersions of this invention at various concentrations in neoprene stock formulations. In each example, the components are mixed together in a two-roll mill until substantially homogeneous. The scorch values as determined in a Mooney test and the oscillating disk rheometer are reported below.

| Example: | Parts by weight | | | | | |
|---|---|---|---|---|---|---|
| | H | I | J | K | L | M |
| Neoprene GNA | 100 | 100 | 100 | 100 | 100 | 100 |
| Stearic acid | 0.5 | 0.5 | 0.5 | 0.5 | 0.5 | 0.5 |
| Product of example 9 | 12 | 8 | 6 | 4 | 2 | 1 |
| Mooney scorch (minutes for 5 point rise above minimum value at 121° C.) | 65 | 65 | 65 | 65 | 65 | 65 |
| Test results (ODR) (100 cycles 153° C.): | | | | | | |
| $M_L$ | 1.8 | 1.8 | 1.8 | 1.8 | 1.8 | 2.0 |
| $T_s2$ | 10.8 | 10.8 | 10.8 | 10.8 | 10.8 | 12 |
| $T_c90$ | 18.5 | 18.0 | 18.5 | 17.5 | 18.0 | 23.0 |
| $M_c90$ | 22.5 | 22.5 | 22.5 | 22.6 | 22.5 | 22.0 |
| $M_H$ | 24.0 | 24.0 | 24.0 | 24.0 | 24.0 | 23.0 |

The data indicates that process safety and vulcanizate quality essentially is independent of concentration of the product of Example 9. Elimination of the necessity for weighing accuracy of the metal oxides has enormous potential for uniformity of compounded polymer. The accomplishment of drastic reductions in metal oxide concentration without improvement of process safety or vulcanizate quality allows greatly reduced polymer compound cost and extension of metal oxide supplies.

Example N

A carbon black-containing chloroprene formulation is prepared as follows:

| Ingredients: | Parts by weight |
|---|---|
| Neoprene GNA (N140P) | 100 |
| Stearic acid | 0.5 |
| Neozone A | 2 |
| SRF Black | 29 |
| Paste of Example 5 | 6 |

The above ingredients were added all at the start to a laboratory banbury mixer ("00" type, 1850 cc. capacity), mixed for four minutes at 60 r.p.m., and dumped at 140° C. The banbury mixed stock is then milled on a two-roll mill for two minutes. No sticking of the stock to either the banbury rotors or the mill rolls is observed. The viscosity and scorch characteristics of the milled stock are as follows:

| | Initially | After bin aging 2 weeks at 38° C. |
|---|---|---|
| Mooney scorch test (121° C.): | | |
| Maximum viscosity | 35 | 31 |
| Minimum viscosity | 13.2 | 16 |
| $T_5$ scorch time (minutes) | 55 | 50 |

The above results demonstrate the excellent safe scorch time obtained by this invention even when the zinc oxide is incorporated into the stock at the same time as the magnesium oxide at the beginning of the mixing. It is even more surprising that the safe scorch factor is obtained since carbon black is present in the mixture. This result is to be contrasted with that obtained from a similar carbon black formulation differing in that the conventional mixing and milling procedure is followed. Four parts of dispersed magnesium oxide are incorporated at the beginning of the mixing followed by the addition of 5 parts of dispersed zinc oxide on a two-roll mill after the magnesium oxide has been thoroughly mixed. The stock exhibits an initial $T_5$ scorch time at 121° C. of only 34 minutes, and only 28 minutes after bin aging. Also significant is the usual stability of the milled stock of the invention to the bin aging reported in the above table.

The properties of the two above-prepared stocks are also compared in the oscillating disk rheometer as described previously (121° C., 1° arc, 100 cycles) and the following results are obtained.

ODR TEST RESULTS

| | Product of example N | Conventional procedure |
|---|---|---|
| Minimum torque ($M_L$) | 3.7 | 5 |
| Scorch time ($T_s2$) | 7.7 | 6.3 |
| Optimum cure time ($T_c90$) | 16.4 | 11.2 |
| Optimum cure torque ($M_c90$) | 32.5 | 35 |
| Maximum torque ($M_H$) | 36 | 38 |

The above results demonstrate the utility of the pastes of this invention in providing practical cure time and properties comparable to or better than those obtained by the sequential and careful addition of dispersed magnesium and zinc oxides.

Examples O–R

The common problem of scorch failure from the use of hydrated (moisture exposed) magnesia is significantly reduced or eliminated by the products of this invention. The following tests illustrate the affect of moisture exposure of magnesia and the paste of Example 5 with respect to their effect on scorch safety. Examples O and P represent the prior art processes.

| Example | O | P | Q | R |
|---|---|---|---|---|
| Neoprene GNA | 100 | 100 | 100 | 100 |
| Stearic acid | 0.5 | 0.5 | 0.5 | 0.5 |
| Magnesia (fresh) | 4 | | | |
| Zinc oxide | 5 | 5 | | |
| Magnesia (moisture exposed*) | | 4 | | |
| Paste of example 5 | | | 4 | |
| Paste of example 5 (moisture exposed*) | | | | 4 |
| Mooney scorch (minutes for 5 point rise above minimum value at 121° C.) | 40 | 7 | 65 | 65 |

*Moisture exposure condition; 24 hours at 38° C. and 100% relative humidity.

The above data show the drastic effect on scorch safety caused by hydrated magnesia and the elimination of this problem with the paste dispersions of the invention.

A common problem with the present use of metal oxide is the increase in the Mooney viscosity of compounded polychloroprene polymer when aged at elevated temperature under humid conditions. The improvement achieved by the pastes of this invention is illustrated by comparing the results obtained in Examples S and T, Example S representing the prior art.

| Example | S | T |
|---|---|---|
| Neoprene GNA | 100 | 100 |
| Stearic acid | 0.5 | 0.5 |
| Magnesium oxide | 4 | |
| Zinc oxide | 5 | |
| Paste of example 5 | | 4 |
| Mooney scorch as mixed ($T_5$ at 121° C., minutes) | 40 | 65 |
| Minimum viscosity | 12 | 7.0 |
| Mooney scorch, after bin aging 2 weeks at 38° C., 100% relative humidity ($T_5$ at 121° C., minutes) | 29 | 60 |
| Minimum viscosity | 26 | 7.0 |

The above tests results indicate that the paste co-dispersions of this invention eliminates the increase of Mooney viscosity of polychloroprene compounded with conventional metal oxides. The decrease in scorch safety also is summarized.

The order of addition of the conventional metal oxides to neoprene stocks is critical to process safety and vulcanizate quality, especially where internal type (banbury) mixing is used. This critical feature is eliminated when the metal oxides are introduced as the paste co-dispersions of this invention. The following examples illustrate this improvement. Examples U–W exemplify the prior art whereas Example X is this invention:

| Example | U | V | W | X |
|---|---|---|---|---|
| Neoprene W | 100 | 100 | 100 | 100 |
| Stearic acid | 0.5 | 0.5 | 0.5 | 0.5 |
| Neozone A | 2 | 2 | 2 | 2 |
| Magnesia | 4 | 4 | 4 | |
| SRF pigment | 58 | 58 | 58 | 58 |
| Process oil | 12 | 12 | 12 | 12 |
| Paste of example 5 | | | | 4 |
| Zinc oxide | 5 | 5 | 5 | |
| NA-22 accelerator | 0.5 | 0.5 | 0.5 | 0.5 |

The above stocks were prepared as follows:

Example U

All of the ingredients except the NA-22 are added at the beginning of the mixing in a type OOC banbury mixer operated at 60 r.p.m. The NA-22 is added at the three minute mark. The batch is dumped in four minutes.

Example V

Same procedure as Example U except zinc oxide is added at the three minute mark with NA-22. The batch is dumped in four minutes.

Example W

All of the ingredients except the NA-22 and zinc oxide are added at the beginning of the mixing in a type OOC banbury mixer operating at 60 r.p.m. The NA-22 is added at the three minute mark and the batch is dumped in four minutes. After cooling, the mixture is charged back to a banbury mixer and then mixed four minutes with the zinc oxide.

Example X

All of the ingredients are added at the start of the banbury mixing (type OOC operated at 60 r.p.m.), except the NA-22 which is added at the three minute mark. The batch is dumped in four minutes.

The results of the various tests carried out on the product of Examples U-X are as follows:

| Examples | U | V | W | X |
|---|---|---|---|---|
| Mooney scorch (T₅ at 121° C., minutes) | 7 | 10 | 12 | 14 |
| Compression set "B" 22 hrs. at 70° C. Stock cured 20 mins. at 153° C | 14 | 26 | 14 | 12 |
| Percent retention of elongation stocks cured 20 min. at 153° C. and heat aged 3 days at 121° C | 80 | 57 | 82 | 84 |

The above data show that when zinc oxide is added at the start of the banbury mixing cycle, scorch problems result. When zinc oxide is added at the end of the mixing cycle, scorch problems are reduced but poorer compression set and heat aging results. When the zinc oxide is added in a special second banbury step, good scorch safety, compression set and heat aging are obtained. However, this second banbury mixing step is costly and time consuming. On the other hand, the paste co-dispersion of this invention provides the same good scorch safety, compression set and heat aging in a single mixing step as is obtained in the two banbury mixing steps, but with greatly reduced mixing costs.

The paste co-dispersions of this invention are nonflowable cohesive soft pastes at ambient temperatures. The pastes are heat and time stable, and the oxide particles remain uniformly dispersed over an extended time period. The temperature stability can be demonstrated by subjecting the paste to a heat test in which the paste is heated at 100° C. for 14 days and cooled. At the end of this test, the characteristics of the paste are unchanged even though the paste had liquified at the elevated temperature of the test. The pastes of the invention will soften and liquify at temperatures above about 150°-170° F. but they retain the properties of dispersion.

Although the paste is stable to changes of temperature and time after cooling, it does reduce in viscosity readily when mixed into polymer stock. This advantage is believed to result from the thixotropic nature of the paste and the elevated temperature used in banbury mixing.

The utility of the paste co-dispersions of the invention as curing additives to halogenated polymers has been illustrated. It can be seen that the paste co-dispersion of the invention offers new processing possibilities for neoprene curing and the advantages of the use of the paste may be summarized as follows:

1. Allows safe addition of zinc oxide at the very start of the mix where best pigment dispersion in the polymer is obtained;
2. Reduces the amount of oxide required;
3. Allows safe, one-pass mixing in place of the more costly two-pass mixing;
4. Reduces storage stability problems of the gum stocks;
5. Reduces magnesia and zinc oxide powder hydration difficulties;
6. Reduces magnesia and zinc oxide mixing and weighing difficulties;
7. Improves uniformity of dispersions in polymer stock; and
8. Generally improves scorch, bin stability, viscosity, stress/strain, compression set, and water and heat resistance of the polymer stock.

The embodiments of the invention in which the exclusive property or privilege is claimed are as follows:

1. A paste co-dispersion comprising a mixture of from about 30 to about 80 parts by weight of magnesium oxide and from about 10 to about 60 parts by weight of zinc oxide, the oxides having an average particle size of up to about 10 microns, a non-aqueous liquid vehicle, and an oil-soluble or oil-dispersible surface active agent.

2. The paste co-dispersion of claim 1 wherein the surface active agent is an oil soluble surfactant having a hydrocarbon chain from about 2 to 75 carbon atoms and containing hydroxyl or carboxyl groups.

3. The paste co-dispersion of claim 2 wherein the surface active agent is a sorbitan fatty acid ester, fatty acid ester, polyoxyethylene sorbitol ester or a fatty acid ester of an alkylene glycol.

4. A paste co-dispersion of metal oxides consisting essentially of a mixture of from about 30 to 80 parts by weight of magnesium oxide, from about 10 to 60 parts by weight of zinc oxide, the oxides having an average particle size of up to about 10 microns, and from about 1 to 5 parts by weight of an oil-soluble or oil-dispersible surface active agent in a mineral oil vehicle.

5. The paste co-dispersion of claim 4 wherein there is also included from about 1 to 5 parts by weight of a modifying agent consisting of waxes, metallic soaps, and clay.

6. The paste co-dispersion of claim 4 wherein the surface active agent is an oil soluble surfactant containing from about 2 to 75 carbon atoms and also containing hydroxyl or carboxyl groups.

7. A paste co-dispersion of metal oxides for compounding with halogen-containing polymeric compositions which comprises about 50 parts by weight of magnesium oxide, about 20 parts by weight of zinc oxide, the oxides having an average particle size of up to about 10 microns, from about 1 to 5 parts by weight of an oil-soluble or oil-dispersible surface active agent, from about 1 to 5 parts by weight of micro-crystalline wax, and from about 20 to 30 parts by weight of a mineral oil vehicle.

8. A water-resistant paste co-dispersion consisting essentially of about 50 parts of magnesium oxide, about 20 parts of zinc oxide, the oxides having an average particle size of up to about 10 microns, about 1 part of sorbitan trioleate, about 4 parts of castor wax and about 25 parts of mineral oil.

9. The paste co-dispersion of claim 7 wherein the paste also contains up to about 5% of an organic curing accelerator.

References Cited

UNITED STATES PATENTS 3,717,600   2/1973   Dalhuisen et al. ___ 260—28.5 A

OTHER REFERENCES

Vulcanization of Elastomers, Alliger et al., 1964, pp. 268-270 relied upon.

MORRIS LIEBMAN, Primary Examiner

S. L. FOX, Assistant Examiner

U.S. Cl. X.R.

252—475

UNITED STATES PATENT OFFICE
CERTIFICATE OF CORRECTION

Patent No. 3,850,845                 Dated November 26, 1974

Inventor(s) Glenn C. Vickery

It is certified that error appears in the above-identified patent and that said Letters Patent are hereby corrected as shown below:

Column 2, line 7, "magensium" should be --magnesium--;
       line 39, "predomniates" should be --predominates--.

Column 3, line 19, "powderes" should be --powders--;
       line 33, after "It" delete "is";
       line 55, "mangesia" should be --magnesia--.

Column 4, line 29, "magnesium" should be --magnesia--.

Column 5, line 54, "promatic" should be --aromatic--;
       line 54, "paraffinc" should be --paraffinic--.

Column 6, line 15, before "since" delete the parenthesis "(".

Column 9, line 53, "althogether" should be --altogether--.

Column 13, line 20, "improvement" should be --impairment--.

Signed and sealed this 24th day of June 1975.

(SEAL)
Attest:

RUTH C. MASON
Attesting Officer

C. MARSHALL DANN
Commissioner of Patents
and Trademarks